US011436505B2

(12) United States Patent
Canada et al.

(10) Patent No.: US 11,436,505 B2
(45) Date of Patent: Sep. 6, 2022

(54) DATA CURATION FOR CORPUS ENRICHMENT

(71) Applicant: International Business Machines Corporation, Armonk, NY (US)

(72) Inventors: Tracy Canada, Angier, NC (US); Jim Dewan, Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 501 days.

(21) Appl. No.: 16/656,280

(22) Filed: Oct. 17, 2019

(65) Prior Publication Data

US 2021/0117820 A1 Apr. 22, 2021

(51) Int. Cl.
G06N 5/04 (2006.01)
(52) U.S. Cl.
CPC ...................................... *G06N 5/04* (2013.01)
(58) Field of Classification Search
None
See application file for complete search history.

(56) References Cited

U.S. PATENT DOCUMENTS

| | | |
|---|---|---|
| 9,208,147 B1 | 12/2015 | Nichols et al. |
| 9,754,207 B2 | 9/2017 | Allen et al. |
| 10,169,706 B2 | 1/2019 | Allen et al. |
| 2011/0113032 A1 | 5/2011 | Boscolo et al. |
| 2011/0314011 A1 | 12/2011 | Buehrer et al. |
| 2012/0078636 A1 | 3/2012 | Ferrucci et al. |
| 2012/0233160 A1 | 9/2012 | Koomullil et al. |
| 2012/0301864 A1 | 11/2012 | Bagchi et al. |
| 2014/0272884 A1 | 9/2014 | Allen et al. |
| 2014/0272909 A1 | 9/2014 | Isensee et al. |
| 2015/0044659 A1 | 2/2015 | Basu et al. |
| 2016/0048514 A1* | 2/2016 | Allen ................ G06F 16/24522 707/731 |
| 2016/0078361 A1 | 3/2016 | Brueckner et al. |
| 2016/0180237 A1 | 6/2016 | Ahuja et al. |
| 2016/0196491 A1 | 7/2016 | Chandrasekaran et al. |
| 2017/0124487 A1 | 5/2017 | Szeto et al. |
| 2017/0132288 A1 | 5/2017 | Ho et al. |
| 2017/0161619 A1 | 6/2017 | Franceschini et al. |

OTHER PUBLICATIONS

Chu-Carroll et al. "Textual resource acquisition and engineering." IBM Journal of Research and Development 56.3.4 (2012): 4-1.
Fan et al. "Automatic knowledge extraction from documents" IBM Journal of Research and Development 56.3.4 (2012): 5-1.
Murtaza et al. "How to effectively train IBM Watson: Classroom experience " System Sciences (HICSS), 2016 49th Hawaii International Conference on. IEEE, 2016.
Haggender et al. "EIRA—An Application for Finding and Ranking Researchers" DISS, Chalmers University of Technology University of Gothenburg Department of Computer Science and Engineering Gothenburg, Sweden (2016).

(Continued)

*Primary Examiner* — Brian Whipple
(74) *Attorney, Agent, or Firm* — Patterson + Sheridan, LLP (57) ABSTRACT

Techniques for data curation are provided. A data set is received for ingestion into a question answering system, where the data set includes a first question and a first answer. Relevance of the first question is validated by comparing the first question to a first question cluster in the question answering system, and it is determined that the first answer satisfies predefined security criteria. The first data set is evaluated to identify a set of references, and a generalized data set is generated by replacing each respective reference of the set of references with a corresponding entity identifier. The first generalized data set is then ingested into the question answering system.

20 Claims, 5 Drawing Sheets

(56) References Cited

OTHER PUBLICATIONS

Kelly III, "Computing, cognition and the future of knowing: How humans and machines are forging a new age of understanding." IBM Research (2015).

Xuguang Li, "A Study of Knowledge Construction in Virtual Product User Communities," University of Sheffield, Oct. 2014, 423 pages.

John Gero and Mary Lou Maher, "Computational and Cognitive Models of Creative Design VI," International Conferecne of Computational and Cognitive Models of Creative Design VI, Dec. 2005, 385 pages.

Disclosed Anonymously," Knowledge Driven Approach to Determine Health of Cognitive Model," Dec. 4, 2018, IPCOM000256507D, 4 pages.

Disclosed Anonymously,"A Cognitive learning-based approach to find matching solution assets for new requirements from an existing client and project," Oct. 15, 2018, IPCOM000255801D, 4 pages.

Disclosed Anonymously,"A cognitive system to assess as soon as possible security exposures in a customer environment," Feb. 14, 2017, IPCOM000249244D, 6 pages.

U.S. Appl. No. 16/301,575 "Analysis of Content Sources for Automatic Generation of Training Content," filed Jul. 10, 2018.

\* cited by examiner

DATA CURATION FOR CORPUS ENRICHMENT

BACKGROUND

The present disclosure relates to data curation, and more specifically, to automated data curation to ensure corpus quality.

In computing systems, various data models (e.g., machine learning models) may be deployed to serve any number of goals. Generally, data models can be trained for virtually any purpose, including identification and classification of data (in images, text, video, audio, and the like), generation of new data (such as responses to input data), and the like. These models require rigorous training through ingestion of a large amount of data in order to provide satisfactory results. However, this training data is often difficult and costly to generate, and requires investment of significant time and resources. Further, the models risk becoming stale if new training data is not continuously generated and provided, and the costs of data generation can prevent sufficient refinement.

SUMMARY

According to one embodiment of the present disclosure, a method is provided. The method includes receiving a first data set for ingestion into a question answering system, wherein the first data set includes a first question and a first answer. The method further includes validating relevance of the first question by comparing the first question to a first question cluster in the question answering system. It is determined that the first answer satisfies predefined security criteria. Additionally, the method includes evaluating the first data set to identify a set of references, and generating a first generalized data set by replacing each respective reference of the set of references with a corresponding entity identifier. The first generalized data set is then ingested into the question answering system.

According to a second embodiment of the present disclosure, a computer-readable storage medium is provided. The computer-readable storage medium contains computer program code that, when executed by operation of one or more computer processors, performs an operation. The operation includes receiving a first data set for ingestion into a question answering system, wherein the first data set includes a first question and a first answer. The operation further includes validating relevance of the first question by comparing the first question to a first question cluster in the question answering system. It is determined that the first answer satisfies predefined security criteria. Additionally, the operation includes evaluating the first data set to identify a set of references, and generating a first generalized data set by replacing each respective reference of the set of references with a corresponding entity identifier. The first generalized data set is then ingested into the question answering system.

According to a third embodiment of the present disclosure, a system is provided. The system includes one or more computer processors, and a memory containing a program which, when executed by the one or more computer processors, performs an operation. The operation includes receiving a first data set for ingestion into a question answering system, wherein the first data set includes a first question and a first answer. The operation further includes validating relevance of the first question by comparing the first question to a first question cluster in the question answering system. It is determined that the first answer satisfies predefined security criteria. Additionally, the operation includes evaluating the first data set to identify a set of references, and generating a first generalized data set by replacing each respective reference of the set of references with a corresponding entity identifier. The first generalized data set is then ingested into the question answering system.

DETAILED DESCRIPTION

Many cognitive models require large training sets in order to function accurately and reliably. To provide the needed data, existing solutions rely on extensive manual generation and curation of training data. This manual process is expensive, time-consuming, and difficult. Moreover, the inherent inefficiencies in manual curation prevent rapid refinement or updating of the models. Models that rely on manual generation can thus easily become stale, meaning that the model's operations do not adequately reflect the current formats, standards, and preferences of the users and systems that rely on the models. Models which are not routinely updated may also suffer reduced efficiency and accuracy, as the performance of the model suffers when the input data differs from the data used in training. In addition to the significant costs and time required, manual curation is simply unable to keep up with evolving and changing systems and data.

Embodiments of the present disclosure provide techniques to automatically curate training data, consumable information, or ingestible content for any number of data models. In an embodiment, the data model may be a machine learning model, a cognitive model, or other trained models (including both supervised and unsupervised models). In one embodiment, data models may also include untrained models, such as systems that search or parse corpuses of data, without actively training or learning based on the data. Generally, the term data model refers to any computer model that utilizes a corpus of data in its operation. Embodiments of the present disclosure allow for the rapid, affordable, and efficient deployment of models. Further, embodiments of the present disclosure improve the models and systems themselves by enabling continuous automated processing of new content sources that were not previously considered, as well as determinations of new content that should be ingested in order to ensure the models remain accurate. To do so, embodiments of the present disclosure evaluate, validate, and curate the data in a variety of ways to ensure its relevancy, security, and quality.

In some embodiments, the data is curated for ingestion into a system that relies on a corpus in order to generate responses to questions and request during interactions with users. Although question answering systems are discussed as examples in the present disclosure, any other systems and models may be used. In some embodiments of the present disclosure, exemplar questions and model answers are identified and refined to aid the operations of a question answering system that operates as a digital assistant, helper, chat bot, and the like. For example, in one such embodiment, the question answering system receives queries and other information from users, determines a response based at least in part on the curated data, and responds to the user. In one embodiment, the corpus data is initially collected from any number of sources of data that generally include questions on any number of topics, each with one or more respective answers. For example, in an embodiment, the resources may include previous chat logs, forums, frequently asked questions (FAQs), feedback websites, social media, and the like. This data can be refined, validated, curated, and evaluated in order to ensure the ingested data is sufficiently relevant, reliable, and secure for the models.

Figure 1:
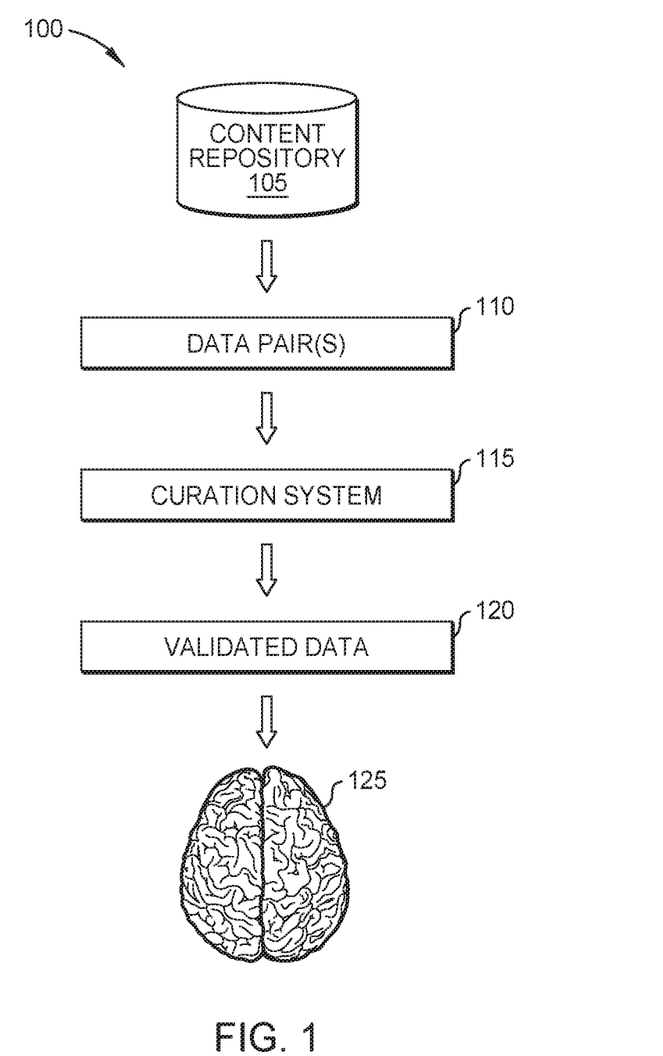
FIG. 1 illustrates a workflow for curating and ingesting data, according to one embodiment disclosed herein.

FIG. 1 illustrates a workflow 100 for curating and ingesting data, according to one embodiment disclosed herein. The illustrated workflow 100 begins with a Content Repository 105 that stores data for training and/or ingesting to improve interactive data models. In the illustrated embodiment, the Content Repository 105 includes Data Pair(s) 110. Each Data Pair 110 generally includes an input and the corresponding output. For example, a Data Pair 110 may include all or a portion of question or request (e.g., from a user) as well as all or a portion of the corresponding answer or response (e.g., from another user, from an artificial intelligence system, and the like).

In some embodiments, the Content Repository 105 includes data collected directly from a variety of sources, such as forums, social media, question services, and the like. In one embodiment, the data in the Content Repository 105 may be preprocessed, screened, or otherwise evaluated prior to inclusion. For example, one or more components may evaluate data sourced directly from FAQs, forums, question and answer sections, feedback mechanisms, and the like in order to identify data to be added to the Content Repository 105. This evaluation may include, for example, evaluating the raw data to identify clusters of similar or related answers and/or questions. In some existing systems, this data in the Content Repository 105 requires additional review and approval (e.g., by a user or subject matter expert) prior to ingestion. Embodiments of the present disclosure provide automated curation, which reduces or eliminates the need for manual review.

In some embodiments, each Data Pair 110 may include multiple inputs for a given output, and/or multiple outputs for a given input. For example, the Data Pair 110 may include a number of variants for a single question (e.g., questions that are seeking the same or similar data or information), as well as a single answer to such questions. Similarly, the Data Pair 110 may include an exemplar question, along with a number of alternative answers. In embodiments, the Data Pairs 110 can include textual content (e.g., natural language questions and answers), documents, links or pointers, uniform resource locators (URLs), files, images, video, audio, and the like. As illustrated, the Data Pair(s) 110 are provided to the Curation System 115.

In an embodiment, the Curation System 115 generally processes, genericizes, authenticates, validates, refines, or otherwise evaluates the Data Pairs 110 in order to produce Validated Data 120. For example, in one embodiment, the Curation System 115 evaluates and confirms the relevance of the Data Pair(s) 110 to the corpus (or a subset thereof), and/or to the Artificial Intelligence (AI) System 125 overall. In another embodiment, the Curation System 115 validates the security of the Data Pair 110. Additionally, in some embodiments, the Curation System 115 can improve the quality of the Data Pairs 115 (e.g., by correcting errors or mistakes, genericizing references, removing extraneous data or aspects of it, and the like).

As depicted in the illustrated workflow 100, the Validated Data 120 is then provided for ingestion by the AI System 125. In some embodiments, the Validated Data 120 is used to train or refine one or more machine learning (ML) models used by the AI System 125. In one embodiment, the Validated Data 120 is added to a repository or corpus of data, to be used to facilitate the operations of the AI System 125. For example, in one embodiment, the AI System 125 is configured to receive input requests or questions, identify a relevant or appropriate section of the corpus, and return an answer or response. In such an embodiment, the AI System 125 can include the Validated Data 120 as a new intent cluster (or add it to an existing intent cluster). When the user input aligns with this intent, the AI System 125 can return all or a portion of the corresponding answer or response indicated by the Validated Data 120.

As used herein, an intent cluster (also referred to as a question cluster, intent class, and/or question class) refers to a collection of data in the corpus that corresponds to a given user intent and/or appropriate responses. For example, a first intent cluster may correspond to a request for a particular document. In an embodiment, this intent cluster can include example textual phrases indicating this intent, as well as one or more example textual responses. User input can then be matched against each intent cluster to identify the most relevant, and the corresponding response data can be used to generate a response.

Figure 2:
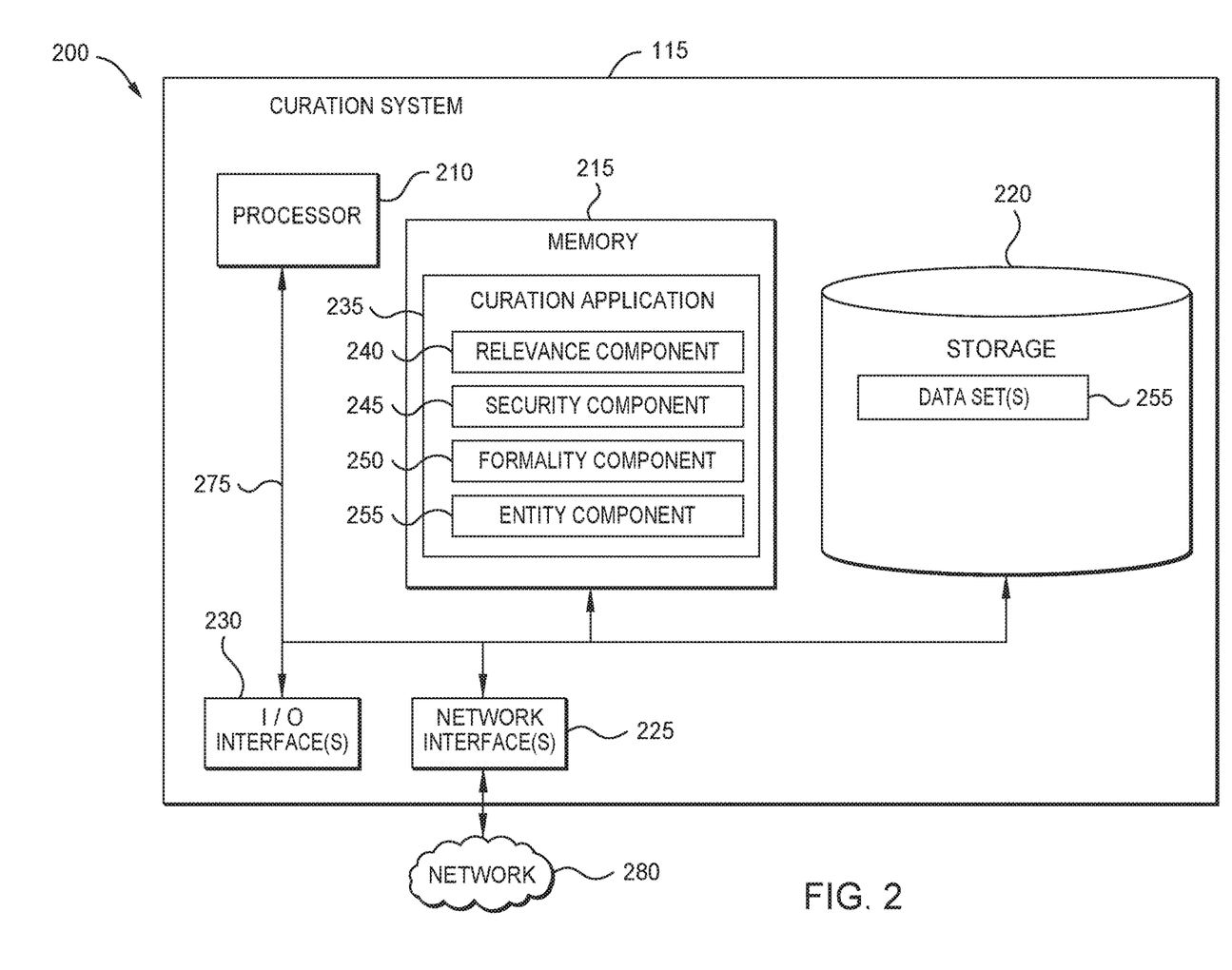
FIG. 2 is a block diagram illustrating a curation system configured to validate and curate data for ingestion into a corpus, according to one embodiment disclosed herein.

FIG. 2 is a block diagram illustrating a Curation System 115 configured to validate and curate data for ingestion into a corpus, according to one embodiment disclosed herein. Although depicted as a physical device, in embodiments, the Curation System 115 may be implemented using virtual device(s), and/or across a number of devices (e.g., in a cloud environment). As illustrated, the Curation System 115 includes a Processor 210, Memory 215, Storage 220, a Network Interface 225, and one or more I/O Interfaces 230. In the illustrated embodiment, the Processor 210 retrieves and executes programming instructions stored in Memory 215, as well as stores and retrieves application data residing in Storage 220. The Processor 210 is generally representative of a single CPU and/or GPU, multiple CPUs and/or GPUs, a single CPU and/or GPU having multiple processing cores, and the like. The Memory 215 is generally included to be representative of a random access memory. Storage 220 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 230. Further, via the Network Interface 225, the Curation System 115 can be communicatively coupled with one or more other devices and components (e.g., via the Network 280, which may include the Internet, local network(s), and the like). As illustrated, the Processor 210, Memory 215, Storage 220, Network Interface(s) 225, and I/O Interface(s) 230 are communicatively coupled by one or more Buses 275. In the depicted embodiment, the Storage 220 includes one or more Data Sets 255. In one embodiment, the Data Sets 255 correspond to data to be evaluated by the Curation System 115. In some embodiments, the Data Sets 255 can include validated data (e.g., data that has been evaluated and approved by the Curation System 115) which is ready for ingestion into the AI System 125. Although depicted as residing in Storage 220, in embodiments, the Data Sets 255 may reside in any suitable location, including in Memory 215, or in one or more remote storage locations.

As illustrated, the Memory 215 includes a Curation Application 235. Although depicted as software residing in Memory 215, in embodiments, the functionality of the Curation Application 235 can be implemented using hardware, software, or a combination of hardware and software. The Curation Application 235 includes a Relevance Component 240, a Security Component 245, a Formality Component 250, and an Entity Component 255. Although depicted as discrete components for conceptual clarity, in embodiments, the operations of the Relevance Component 240, Security Component 245, Formality Component 250, and Entity Component 255 may be combined or distributed across any number of components.

In an embodiment, the Relevance Component 240 evaluates input Data Sets 255 to determine their relevancy to the system. In one embodiment, the Data Sets 255 have been preprocessed to identify an intent, and the Relevance Component 240 evaluates the Data Set 255 to compare the input to the corresponding intent cluster, as it is currently reflected in the AI System 125. For example, the Relevance Component 240 may evaluate the question, input, and/or request portion of the Data Set 255 to confirm whether it is a reasonable variation of the corresponding system intent (e.g., another way to state the request or question that the intent in the AI System 125 represent). In some embodiments, the Relevance Component 240 applies one or more thresholds to determine whether the request can be automatically ingested into the corpus as an exemplar or alternative way to phrase the intent. For example, a minimum confidence can be used to confirm it is sufficiently close. In at least one embodiment, a maximum threshold is also applied to ensure that the request is not excessively similar to existing data in the corpus.

To determine the relevance of the input portion of the Data Set 255, the Relevance Component 240 can utilize any number of techniques. For example, in one embodiment, the Relevance Component 240 uses natural language processing (NLP) to generate a similarity score between the input and the data stored in the corpus. In some embodiments, the AI system is configured to receive input and match it to one or more classes (also referred to as intents) in the corpus, based on a number of factors. These matches can also be accompanied by a confidence score, indicating a confidence or probability that the input aligns with the respective class or intent (e.g., a likelihood that the answers included in the class can be used to respond to the input). In at least one embodiment, to generate a similarity measure, the Relevance Component 240 provides the question as input to the AI system, and uses the confidence score generated for the indicated class as the similarity measure.

In some embodiments, the Relevance Component 240 additionally analyzes the answer or response portion of the Data Set 255 to confirm that it is not duplicative. For example, in one embodiment, the Relevance Component 240 performs normalization on the response, and compares it to the existing answers/responses for the indicated intent in the corpus. If the response similarity exceeds a threshold, the Relevance Component 240 can determine it should not be ingested. In another embodiment, the Relevance Component 240 normalizes the link or address of the answer (e.g., a URL to a document to be returned as the response) and compares it to other responses in the class, to ensure that ingesting it will not cause the corpus to contain duplicate responses with minor variations.

In the illustrated embodiment, the Security Component 245 evaluates the Data Set 255 to confirm the security of the input, in order to ensure it can be safely ingested into the corpus/AI system. In one embodiment, this includes confirming that the answer (or any data it includes, such as links to data objects, addresses of web pages, and the like) is not found on a predefined blacklist. For example, in such an embodiment, the Security Component 245 may refer to a blacklist of web sites or resources that are internal to a corporate entity and should not be disseminated to the general public. If all or a portion of the response is on such a blacklist, the Security Component 245 can reject the data pair as being insecure.

In some embodiments, the Security Component 245 further confirms that the response information and/or documents can be located using public means. For example, the Security Component 245 may search publically available systems (e.g., search engines) using the address of the answer and/or the content of the answer to confirm that it can be located using such a public system. If so, the Security Component 245 determines that the response is sufficiently secure for ingestion into the corpus. Otherwise, the Security Component 245 can reject the data as not suitable for ingestion.

In an embodiment, the Formality Component 250 can refine or formalize the data pair for ingestion once it is approved by the Relevance Component 240 and/or Security Component 245. In one embodiment, this includes running the input and/or response of the data pair through an evaluation process to identify and correct spelling errors, typographical errors, grammatical errors, and the like. In some embodiments, the Formality Component 250 further removes stop words from the data pair. As used herein, stop words are generally common words (such as "the") that do not aid in understanding or determining the intent of the text, and can lead to confusion or misclassification. In some embodiments, the stop words can include common phrases such as "how do I," "where are," "is there," and the like.

In the illustrated embodiment the Entity Component 255 evaluates the approved input and/or response to identify references to predefined entities such as products, acronyms, nicknames, companies, individuals, and the like. The Entity Component 255 can then replace each such reference with an identifier or entity that genericizes the data to allow faster and more efficient matching. For example, suppose a product has a formal name of "The Equalizer," and the product is often referred to as "the EQ" in conversation. In an embodiment, the Entity Component 255 can replace both "The Equalizer" and "the EQ" with a common entity identifier that uniquely identifies the product. This enables input to be categorized and evaluated with higher confidence, as the Entity Component 255 can identify relevant data regardless of the terminology used.

In an embodiment, once a given pair of data has been processed and evaluated by each component, it is ingested into the corpus and/or AI system. Advantageously, this bypasses the traditional (manual) approval process, and dramatically improves the ability of the AI system to learn and evolve using new data.

Figure 3:
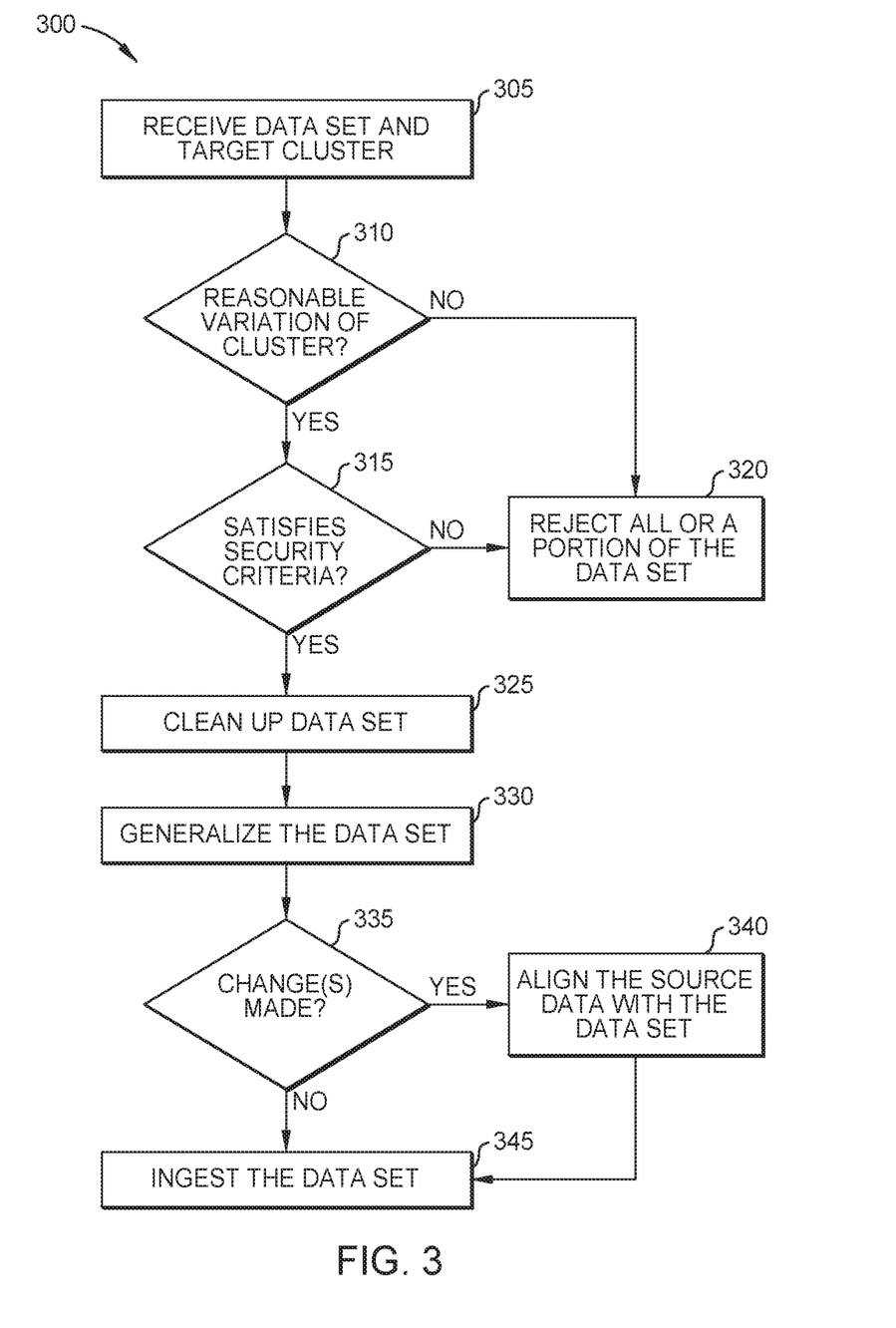
FIG. 3 is a flow diagram illustrating a method for evaluating, validating, and ingesting data into a corpus, according to one embodiment disclosed herein.

FIG. 3 is a flow diagram illustrating a method 300 for evaluating, validating, and ingesting data into a corpus, according to one embodiment disclosed herein. The method 300 begins at block 305, where a Curation Application 235 receives a data set (e.g., one or more inputs, such as questions or requests, as well as one or more outputs, such as responses or answers). In the illustrated embodiment, the Curation Application 235 further receives a target cluster/class for the data. In an embodiment, as discussed above, the data is evaluated to identify the intent of the input, and the data is assigned to a cluster or class of intents based on this intent. Stated differently, the indicated target cluster/class generally indicates the portion of the corpus to which the data pair will be assigned, if it is approved and ingested. In an embodiment, if user input matches a given cluster/class, the AI system can generate and return a response using any response data included in the cluster/class. Ingesting additional data therefore expands the capabilities of the system to recognize and accurately match input, and further expands the potential response or answer data that can be returned.

At block 310, the Curation Application 235 determines whether the input portion of the received data set is a reasonable variation on the indicated target cluster/class. That is, the Curation Application 235 determines whether the input defines an intent that aligns with the intent of the target class. In one embodiment, the Curation Application 235 does so by providing the input to the AI system, and evaluating the returned confidence measure. In some embodiments, the Curation Application 235 uses a maximum and minimum threshold. The minimum threshold can confirm that the new data set is sufficiently similar to the cluster (such that ingesting it would not reduce confidence levels because it is too-far from the cluster). Further, the maximum threshold can confirm that the new data set is sufficiently dissimilar from the existing cluster, such that ingesting it would not be duplicative and not useful. In one embodiment, the Curation Application 235 uses a minimum threshold of 60% confidence, and a maximum threshold of 80% confidence.

If the Curation Application 235 determines that all or part of the received data set is not a reasonable variation of the cluster (e.g., because the response is a duplicate, and/or the input is overly similar or dissimilar), the method 300 proceeds to block 320. At block 320, the Curation Application 235 rejects all or a portion of the received data pair. In one embodiment, the Curation Application 235 only rejects the portion of the set that failed the relevance evaluation. For example, if the answer is duplicative but the question is a reasonable variant, the Curation Application 235 can reject the answer but continue processing the question. In another embodiment, if the data set includes multiple inputs and/or outputs, the Curation Application 235 can reject only those inputs/outputs which failed the evaluation, while continuing to process the data that passed the relevance evaluation.

If at least a portion of the received data set remains valid (e.g., was not rejected by the Curation Application 235), the method 300 continues to block 315 where the workflow continues for the remaining data. Similarly, if at block 310 the Curation Application 235 determines that the data set is a reasonable variation of the class, the method 300 continues to block 315. At block 315, the Curation Application 235 analyzes the data to determine whether it satisfies predefined security criteria. In one embodiment, as discussed above, this includes confirming that no portion of the included response (e.g., files, documents, websites, images, videos, and the like) are included on a predefined blacklist (or are linked or accessed via an address that is on the blacklist). If so, the method 300 proceeds to block 320, where at least the blacklisted data is rejected.

In one embodiment, the security check also includes confirming that all or a portion of the response (e.g., files, documents, websites, videos, and the like) are publically-accessible, such as using one or more public search engines. If not, the method 300 proceeds to block 320, where the inaccessible portion(s), or the entire response, are rejected. If the data passes the security check, the data set is considered approved, and the method 300 continues to block 325.

At block 325, the Curation Application 235 cleans up the data set. This may include, for example, completing a spell check, correcting grammar, removing stop words, and the like. Additionally, at block 330, the Curation Application 235 generalizes the data set. As discussed above, this can include, for example, replacing product references with entity identifiers. This genericizes the data such that matching can be improved. For example, during runtime, the system can determine what entity the user is referring to in their question or request (e.g., which product, company, individual, location, and the like), and replace the reference with the corresponding identifier. The input can then be used to query the corpus and identify other references to the same entity.

The method 300 then continues to block 335, where the Curation Application 235 determines whether any changes were made to the data set during the curation process. For example, the Curation Application 235 can determine whether the cleaning process of block 325 and/or the genericizing process of block 330 caused any changes to be made to the data set (e.g., correcting typographical or grammatical errors, removing stop words, replacing references with entity identifiers, and the like). If so, the method 300 proceeds to block 340, where the Curation Application 235 aligns the source data with the revised data set. That is, if the Curation Application 235 is authorized to modify the source from which the data set was gathered, the Curation Application 235 can do so to correct it and ensure it better aligns with the data that is ultimately ingested into the corpus.

For example, suppose the response includes data collected from a webpage hosted or provided by the entity that maintains the AI system and/or Curation Application 235. In an embodiment, the Curation Application 235 can update the webpage to correct any typographical or grammatical errors identified in block 325. In some embodiments, the Curation Application 235 does not perform stop word removal or entity replacement on the original data source. The method 300 then proceeds to block 345.

Returning to block 335, if the Curation Application 235 determines that no revisions were made, the method 300 similarly proceeds to block 345. At block 345, the Curation Application 235 ingests the curated data set into the corpus and/or the AI system. In this way, the Curation Application 235 can rely on the data set to respond to future user inquiries during runtime.

Figure 4:
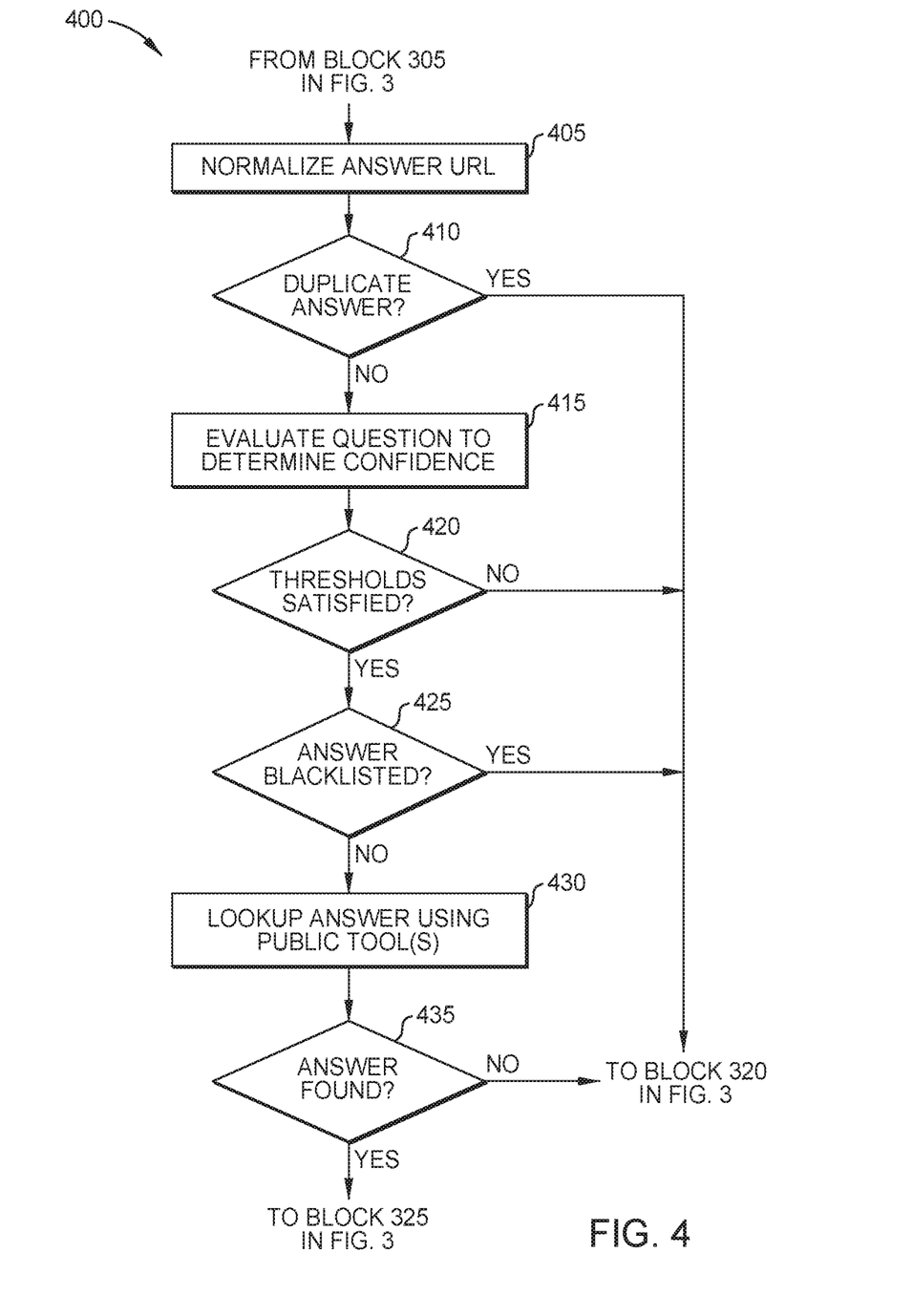
FIG. 4 is a flow diagram illustrating a method for validating relevancy and security of data for ingestion into a corpus, according to one embodiment disclosed herein.

FIG. 4 is a flow diagram illustrating a method 400 for validating relevancy and security of data for ingestion into a corpus, according to one embodiment disclosed herein. In an embodiment, the method 400 provides additional detail for the approval process described above with reference to blocks 310 and 315 of FIG. 3. Specifically, blocks 405, 410, 415, and 420 correspond to block 310, while blocks 425, 430, and 435 correspond to block 315. The method 400 begins at block 405 (continued from block 305 in FIG. 3), where the Curation Application 235 normalizes the address or pointer associated with the answer (e.g., a URL used to retrieve the answer/response). This may include, for example, removing unimportant or irrelevant aspects of the URL such as "http://", parameters appended to the URL, and the like. At block 410, the Curation Application 235 evaluates this normalized URL to determine whether the answer duplicates an existing answer associated with the target class in the corpus.

If so, the method 400 proceeds to block 320 of FIG. 3. If not, the method 400 continues to block 415, where the Curation Application 235 applies the question of the data pair as input to the AI system, and determines the confidence measure associated with the target cluster/class. As discussed above, in an embodiment, the AI system evaluates input and scores each respective intent cluster/class based on the confidence that the input should be assigned to the respective cluster. This confidence can be returned to the Curation Application 235 for evaluation. At block 420, the Curation Application 235 determines whether the confidence measure satisfies one or more predefined thresholds.

In one embodiment, the Curation Application 235 uses a minimum threshold to confirm that the data set under evaluation is sufficiently similar to the target cluster. Similarly, in some embodiments, the Curation Application 235 uses a maximum threshold to ensure the data set under evaluation is sufficiently dissimilar from the existing cluster, such that ingesting it would not be duplicative or wasteful. For example, if the question perfectly (or closely) matches another question that has already been ingested, the Curation Application 235 may refrain from ingesting the currently-evaluated question. This may be because doing so would not improve the system (e.g., the data is already reflected in the corpus), would waste resources, and/or because doing so may cause over-fitting (e.g., other similar questions will be less likely to be correctly identified).

If the thresholds are not satisfied, the method 400 continues to block 320 of FIG. 3. Otherwise, the method 400 continues to block 425, where the Curation Application 235 determines whether all or a portion of the answer corresponds to a blacklisted source. For example, the Curation Application 235 may refer to a predefined list of internal sources and directories, and the Curation Application 235 can determine whether any portion of the answer is located in such an internal source. If so, the method 400 can proceed to block 320 to reject the answer. In some embodiments, the Curation Application 235 rejects the entire data set if any portion of the answer is blacklisted. In another embodiment, the Curation Application 235 only removes the blacklisted portion(s).

Additionally, in at least one embodiment, the method 400 may nevertheless proceed to block 430, where the Curation Application 235 looks up the answer using one or more publicly-accessible tools. In some embodiments, the Curation Application 235 may attempt to locate resources that were otherwise blacklisted. For example, the answer may point to a document stored internally, but the same document may nevertheless be accessible via other public means. At bloc 435, the Curation Application 235 determines whether the answer was found in the public systems. In an embodiment, if all or a portion of the answer cannot be located using public tools, the method 400 proceeds to block 320 of FIG. 3, and the inaccessible portion(s), or the entire answer and/or the entire data set, are rejected. Otherwise, the method 400 proceeds to block 325 in FIG. 3.

Figure 5:
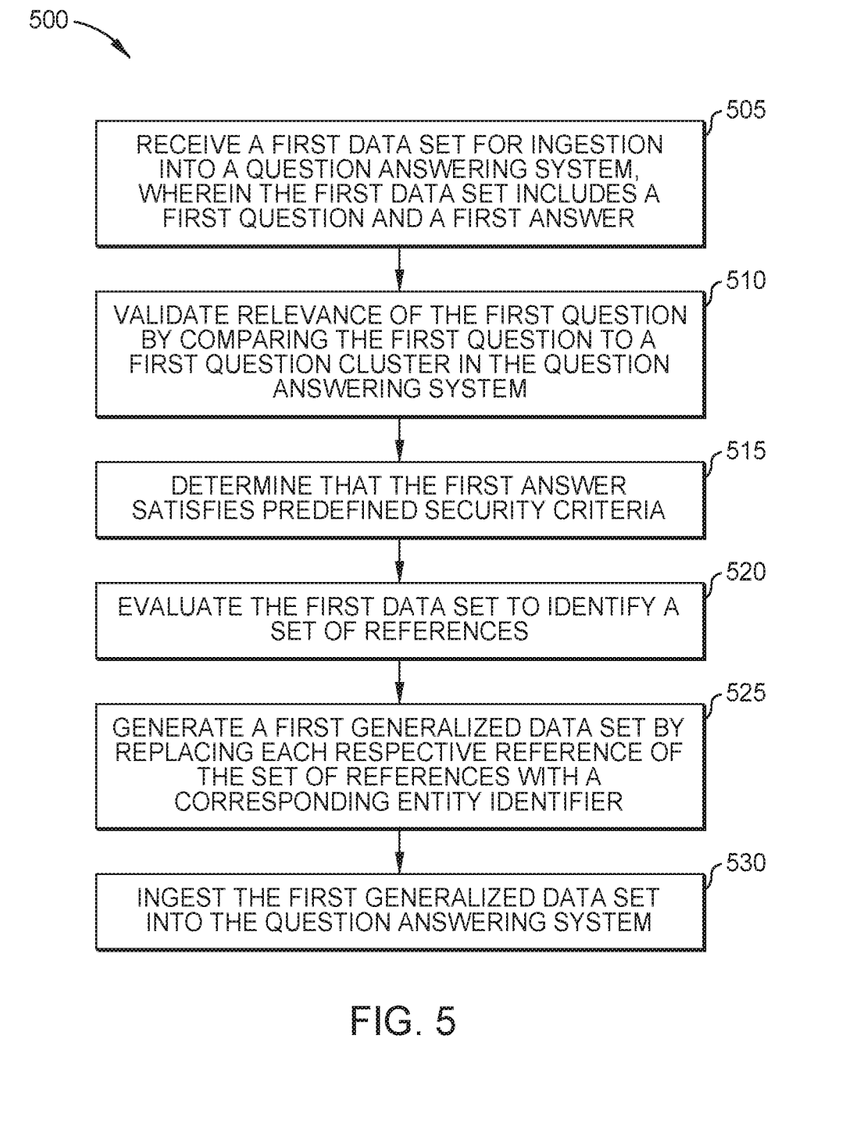
FIG. 5 is a flow diagram illustrating a method for evaluating and curating data for ingestion into a corpus, according to one embodiment disclosed herein.

FIG. 5 is a flow diagram illustrating a method 500 for evaluating and curating data for ingestion into a corpus, according to one embodiment disclosed herein. The method 500 begins at block 505, where a Curation Application 235 receives a first data set for ingestion into a question answering system, wherein the first data set includes a first question and a first answer. At block 510, the Curation Application 235 validates relevance of the first question by comparing the first question to a first question cluster in the question answering system. Similarly, at block 515, the Curation Application 235 determines that the first answer satisfies predefined security criteria. The method 500 then proceeds to block 520, where the Curation Application 235 evaluates the first data set to identify a set of references. At block 525, the Curation Application 235 generates a first generalized data set by replacing each respective reference of the set of references with a corresponding entity identifier. The method 500 then continues to block 530, where the Curation Application 235 ingests the first generalized data set into the question answering system.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding and/or following, reference is made to embodiments presented in this disclosure. However, the scope of the present disclosure is not limited to specific described embodiments. Instead, any combination of the preceding and/or following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding and/or following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Curation Application 235) or related data available in the cloud. For example, the Curation Application 235 could execute on a computing system in the cloud and evaluate and approve data. In such a case, the Curation Application 235 could evaluate the relevance and security of data pairs, and store approved data at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
    receiving a first data set for ingestion into a question answering system, wherein the first data set includes a first question and a first answer;
    validating relevance of the first question by comparing the first question to a first question cluster in the question answering system;
    determining that the first answer satisfies predefined security criteria;
    evaluating the first data set to identify a set of references;
    generating a first generalized data set by replacing each respective reference of the set of references with a corresponding entity identifier; and
    ingesting the first generalized data set into the question answering system.

2. The method of claim 1, wherein validating the relevance of the first question comprises:
    generating a confidence measure indicating a probability that the first question belongs to the first question cluster;
    determining that the confidence measure exceeds a predefined minimum confidence; and
    determining that the confidence measure is below a predefined maximum confidence.

3. The method of claim 2, wherein generating the confidence measure comprises providing the first question as input to the question answering system, wherein the question answering system is configured to:
    evaluate input questions to determine an intent of the input questions;
    identify one or more question clusters which may correspond to the determined intent; and
    generate a respective confidence measure for each respective question cluster.

4. The method of claim 1, wherein determining that the first answer satisfies the predefined security criteria comprises:
    determining an address of the first answer;
    upon determining that the address is not included in a predefined blacklist, searching one or more publicly available systems based on either (i) the address or (ii) the first answer; and
    confirming that the first answer can be located using at least one of the one or more publically available systems.

5. The method of claim 1, the method further comprising:
    determining a uniform resource locator (URL) corresponding to the first answer;
    performing normalization on the URL; and
    confirming that the normalized URL is not associated with the first question cluster in the question answering system.

6. The method of claim 1, the method further comprising:
    applying one or more spell check or grammar check techniques to identify and correct errors in the first data set; and
    processing the first data set to remove stop words.

7. The method of claim 1, the method further comprising:
    determining a source location of the first question and the first answer; and
    replacing the first question and the first answer at the source location based on the generalized data set.

8. A computer-readable storage medium containing computer program code that, when executed by operation of one or more computer processors, performs an operation comprising:
    receiving a first data set for ingestion into a question answering system, wherein the first data set includes a first question and a first answer;
    validating relevance of the first question by comparing the first question to a first question cluster in the question answering system;
    determining that the first answer satisfies predefined security criteria;
    evaluating the first data set to identify a set of references;
    generating a first generalized data set by replacing each respective reference of the set of references with a corresponding entity identifier; and
    ingesting the first generalized data set into the question answering system.

9. The computer-readable storage medium of claim 8, wherein validating the relevance of the first question comprises:
    generating a confidence measure indicating a probability that the first question belongs to the first question cluster;
    determining that the confidence measure exceeds a predefined minimum confidence; and
    determining that the confidence measure is below a predefined maximum confidence.

10. The computer-readable storage medium of claim 9, wherein generating the confidence measure comprises providing the first question as input to the question answering system, wherein the question answering system is configured to:
    evaluate input questions to determine an intent of the input questions;
    identify one or more question clusters which may correspond to the determined intent; and
    generate a respective confidence measure for each respective question cluster.

11. The computer-readable storage medium of claim 8, wherein determining that the first answer satisfies the predefined security criteria comprises:
    determining an address of the first answer;
    upon determining that the address is not included in a predefined blacklist, searching one or more publicly available systems based on either (i) the address or (ii) the first answer; and confirming that the first answer can be located using at least one of the one or more publically available systems.

12. The computer-readable storage medium of claim 8, the operation further comprising:
   determining a uniform resource locator (URL) corresponding to the first answer;
   performing normalization on the URL; and
   confirming that the normalized URL is not associated with the first question cluster in the question answering system.

13. The computer-readable storage medium of claim 8, the operation further comprising:
   applying one or more spell check or grammar check techniques to identify and correct errors in the first data set; and
   processing the first data set to remove stop words.

14. The computer-readable storage medium of claim 8, the operation further comprising:
   determining a source location of the first question and the first answer; and
   replacing the first question and the first answer at the source location based on the generalized data set.

15. A system comprising:
   one or more computer processors; and
   a memory containing a program which when executed by the one or more computer processors performs an operation, the operation comprising:
      receiving a first data set for ingestion into a question answering system, wherein the first data set includes a first question and a first answer;
      validating relevance of the first question by comparing the first question to a first question cluster in the question answering system;
      determining that the first answer satisfies predefined security criteria;
      evaluating the first data set to identify a set of references;
      generating a first generalized data set by replacing each respective reference of the set of references with a corresponding entity identifier; and
      ingesting the first generalized data set into the question answering system.

16. The system of claim 15, wherein validating the relevance of the first question comprises:
   generating a confidence measure indicating a probability that the first question belongs to the first question cluster by providing the first question as input to the question answering system, wherein the question answering system is configured to:
      evaluate input questions to determine an intent of the input questions;
      identify one or more question clusters which may correspond to the determined intent; and
      generate a respective confidence measure for each respective question cluster;
   determining that the confidence measure exceeds a predefined minimum confidence; and
   determining that the confidence measure is below a predefined maximum confidence.

17. The system of claim 15, wherein determining that the first answer satisfies the predefined security criteria comprises:
   determining an address of the first answer;
   upon determining that the address is not included in a predefined blacklist, searching one or more publicly available systems based on either (i) the address or (ii) the first answer; and
   confirming that the first answer can be located using at least one of the one or more publically available systems.

18. The system of claim 15, the operation further comprising:
   determining a uniform resource locator (URL) corresponding to the first answer;
   performing normalization on the URL; and
   confirming that the normalized URL is not associated with the first question cluster in the question answering system.

19. The system of claim 15, the operation further comprising:
   applying one or more spell check or grammar check techniques to identify and correct errors in the first data set; and
   processing the first data set to remove stop words.

20. The system of claim 15, the operation further comprising:
   determining a source location of the first question and the first answer; and
   replacing the first question and the first answer at the source location based on the generalized data set.

* * * * *